United States Patent
Weinshenker et al.

[15] 3,689,569
[45] Sept. 5, 1972

[54] PROCESS FOR PRODUCING SUBSTITUTED CYCLOPENTADIENES

[72] Inventors: Ned M. Weinshenker, Sunnyvale, Calif.; Niels H. Andersen, Seattle, Wash.

[73] Assignee: ALZA Corporation

[22] Filed: Jan. 22, 1971

[21] Appl. No.: 108,967

[52] U.S. Cl..........260/611 R, 260/611 A, 260/611 F, 260/468 R, 260/514 R
[51] Int. Cl.............................................C07c 41/00
[58] Field of Search............260/611 R, 611 A, 611 F

*Primary Examiner*—Bernard Helfin
*Attorney*—Paul Sabatine and Steven D. Goldby

[57] ABSTRACT

A novel process for preparing a 5-substituted-1,3-cyclopentadiene of the general formula,

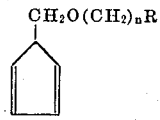

by reacting cyclopentadienyl thallium with $R-(CH_2)_n-O-CH_2X$ wherein R is H,

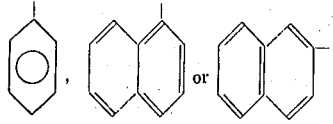

$n$ is 1 to 3 and X is a halogen. The 5-substituted-1,3-cyclopentadienes are useful intermediates for preparing therapeutically useful prostaglandins.

3 Claims, No Drawings

PROCESS FOR PRODUCING SUBSTITUTED CYCLOPENTADIENES

BACKGROUND OF THE INVENTION

The present invention relates to a novel and useful process for preparing 5-substituted-1,3-cyclopentadienes of the following formula:

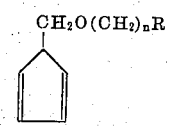

wherein R is hydrogen,

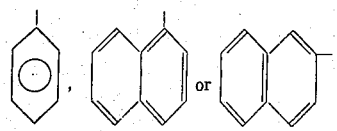

and $n$ is 1 to 3. The 5-substituted-1,3-cyclopentadienes are prepared by reacting cyclopentadienyl thallium with a compound of the formula $R-(CH_2)_nOCH_2X$ wherein R and n are as defined and X is a halogen, for example, chlorine, bromine or iodine. The 5-substituted-1,3-cyclopentadienes are useful as intermediates for preparing by art known chemical methods therapeutically useful prostaglandins.

The prostaglandins are a naturally occurring group of long-chain, unsaturated, oxygenated fatty acids with useful therapeutic properties. The prostaglandins' properties as recorded in *Prostaglandins, Progress In The Chemistry of Fats And Other Lipids*, Vol. IX, Part 2, pages 231 to 273, 1968, Pergamon Press, broadly includes modifiers of smooth muscle activity, gastric secretion, blood pressure, the reproductive system and the like. The chemical art, because of the prostaglandins' valuable properties, has made available in *J. Am. Chem. Soc.*, Vol. 91, pages 5675 to 5677, 1969, a chemical synthesis for preparing the prostaglandins.

In the chemical synthesis, prior to this invention, serious disadvantages have been encountered by the prior art in one of the chemical steps leading to prostaglandins; mainly, in the addition of cyclopentadienyl sodium or cyclopentadienyl lithium to halomethyl methyl ethers to produce 5-methoxymethyl-1,3-cyclopentadiene. One of the disadvantages encountered by the prior art generally include the formation of an unwanted isomerization product 1-methoxymethyl-1,3-cyclopentadiene. This product is formed because of the relatively high basicity of the cyclopentadienyl sodium or lithium, and also because of the continual presence and reacting of the latter cyclopentadienyls with the halo-methylmethyl ether and with newly formed 5-substituted-1,3-cyclopentadiene. The formation of isomerization products further results in decreased yields of 5-substituted-1,3-cyclopentadiene and concomitantly therewith decreased yields of valuable prostaglandins.

Another disadvantage encountered with the use of cyclopentadienyl sodium or lithium is the need for a tedious and difficult isolation step requiring a buffer or an aqueous work-up of the reaction medium for removing from the reaction medium unreacted cyclopentadienyl sodium or lithium and freshly formed sodium or lithium halides during the isolation of the essentially isomerically pure 5-substituted-1,3-cyclopentadienes. The tedious chemical work-up is required not only to obtain the desired product, but also to prevent the formation of unwanted isomeric cyclopentadienes and low yields of 5-substituted-1,3-cyclopentadienes as mentioned supra. Thus, in view of the foregoing discussion, it can readily be seen that the art critically needs a novel and improved chemical synthesis for preparing 5-substituted-1,3-cyclopentadienes that are useful for preparing valuable prostaglandins.

Accordingly, it is an object of the present invention to make available to the art a novel chemical process for preparing 5-substituted cyclopentadienes that essentially overcome the disadvantages encountered by the prior art.

It is a further object of the present invention to provide a novel process for preparing 5-substituted-1,3-cyclopentadienes that can be used in art known chemical synthesis for producing useful therapeutic prostaglandins.

Still a further object of the invention is to provide a process for preparing 5-substituted-1,3-cyclopentadienes wherein the process does not require extensive chemical work-up, and does not tend to produce unwanted isomerization products.

Yet still a further object of the invention is to provide a novel synthesis for synthesizing 5-substituted-1,3-cyclopentadienes wherein the synthesis is reproducible, easy to carry out and is not subjected to decreased yield of the desired product.

These and other objects of the invention will be readily apparent to one skilled in the art upon a study of the present disclosure and the accompanying claims.

SUMMARY OF THE INVENTION

This invention concerns both a novel and useful improved process for preparing 5-(lower alkoxy methyl) and 5-(arylalkoxy methyl)-1,3-cyclopentadienes by reaction of cyclopentadienyl thallium with a lower alkyl or with an arylalkyl halomethyl ether to produce essentially isomerically pure 5-substituted-1,3-cyclopentadienes. The latter compounds are useful for preparing prostaglandins by known chemical processes.

DETAILED DESCRIPTION OF INVENTIVE EMBODIMENTS

In attaining the objects and advantages of this invention, it has now been unexpectedly found that a novel and improved process for preparing 5-substituted-1,3-cyclopentadienes can be made available to the art as represented by the following general reaction:

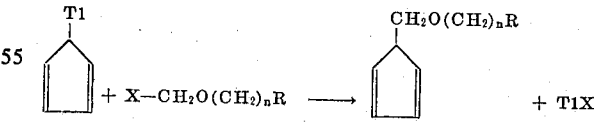

wherein R is a member selected from the group consisting of hydrogen, phenyl, α-naphthyl and β-naphthyl, X is a halogen selected from the group consisting of chloro, bromo and iodo and $n$ is 1 to 3, that is, an alkylene such as methylene, ethylene, propylene and isopropylene.

The novel reaction of the invention is usually carried out by intimately contacting and reacting the reactants at a temperature of about −80°C to 25°C, usually at −10°C to −5°C, in an inert atmosphere and in the presence of an inert organic solvent. The reaction is usually carried out by reacting stoichiometric amounts or an excess of the reactants under normal atmospheric pressure or at elevated pressures up to 5 atmospheres. Generally, a suitable solvent is any solvent that does not adversely affect the reaction such as diethyl ether, 1,2-dimethoxyethane, tetrahydrofuran, methyl ethyl ether, dioxane, benzene, and the like. Representative of inert atmospheres include the inert gases such as argon, and the like, and other inert gases such as nitrogen, and the like, and mixtures thereof. Exemplary of starting ethers suitable for the above reaction are the commercially available and art known ethers such as 2-bromoethyl methyl ether; bromomethyl methyl ether; bromomethyl propyl ether; bromomethyl isopropyl ether; chloromethyl methyl ether; iodomethyl ethyl ether; bromomethyl benzyl ether; and the like as disclosed in *J. Org. Chem.*, Vol. 26, pages 3,761 to 3,769, 1961; *Chem. Abst.*, Vol. 52, page 16,201; ibid., Vol. 53, page 1,105; ibid., Vol. 56, page 7,223; ibid., Vol. 58, page 1,331; and ibid., Vol. 65, page 2,239. The cyclopentadienyl thallium used according to the spirit of the invention is also commer-cially available and it is further known to the art in *Chem. Abst.*, Vol. 52, page 16,366; and in Belgian Pat. No. 620,663.

The following examples are representative of embodiments of the present invention and these examples are not to be construed as limiting as these and other embodiments will be readily apparent to those versed in the art in the light of the present disclosure and the accompanying claims.

EXAMPLE 1

Preparation of 5-(methoxymethyl)-1,3-cyclopentadiene. A dry three-necked flask equipped with a thermometer, a stirrer and an inlet-outlet port is charged with 500 g (1.86 moles) of cyclopentadienyl thallium and 1,500 ml of anhydrous diethyl ether in an inert argon atmosphere. The reaction mixture is next cooled to about −10°C to −15°C and 220 g (1.76 moles) of anhydrous bromomethyl methyl ether is added dropwise and with constant stirring to the reaction medium. The internal reaction temperature is maintained at about −10°C during the addition of the halogenated ether. After all the halogenated ether is added, the reaction mixture is filtered to remove unreacted cyclopentadienyl thallium and thallium bromide to give an ether solution containing the desired 5-(methoxymethyl)-1,3-cyclopentadiene. The inert solvent can be evaporated at about −20°C or the solution containing the 5-(methoxymethyl)-1,3-cyclopentadiene can be used as is in the above mentioned organic synthesis for preparing prostaglandins.

EXAMPLE 2

Preparation of 5-(benzyloxy-methyl)-1,3-cyclopentadiene. A dry flask is charged with 500 g (1.86 moles) of cyclopentadienyl thallium and 1,500 ml of anhydrous diethyl ether in an argon atmosphere. The mixture is cooled to −10°C and 352 g (1.76 moles) of bromomethyl benzyl ether is added dropwise while maintaining the temperature at −15°C to −5°C. After the addition, the mixture is filtered in the cold to give pure ether solution of 5-(benzyloxy-methyl)-1,3-cyclopentadiene. Isolation of the compound can also be accomplished by evaporating the ether at about −20°C.

EXAMPLE 3

Repeating the procedure of Example 2, but replacing bromomethyl benzyl ether with chloromethyl ethyl ether; chloromethyl propyl ether; and chloromethyl α-naphthl methyl ether, the reaction produces 5-(ethoxy methyl)-1,3-cyclopentadiene; 5-(propoxy methyl)-1,3-cyclopentadiene; 5-(α-naphthylmethoxymethyl)-1,3-cyclopentadiene.

The 5-methoxymethyl-1,3-cyclopentadienes produced by this invention have known utility for the production of stereo-controlled synthesis of pharmaceutically active prostaglandins as set forth, for example, in *J. Am. Chem. Soc.*, Vol. 91, pages 5,675 to 5,678, 1969. The compound is used in the Diels-Alder reaction and in the reaction listed in the references as 1 through 16 inclusive to yield prostaglandins PGE$_2$ (11α, 15(S)-dihydroxy-9-oxo-5-cis, 13-trans-prostadienoic acid) and PGF$_{2\alpha}$(9α,11α,15(S)-trihydroxy-5-cis,13-trans-prostadienoic acid). Both of these prostaglandins are useful as therapeutics, such as, for inducing labor, the stimulation of smooth muscles, the terminating of pregnancy, and the like.

As is evident from the above examples and discussion, it is readily apparent that this invention makes available to the art an unobvious method for producing 5-substituted-1,3-cyclopentadienes that can be successfully used for synthesizing valuable prostaglandins without being subjected to the disadvantages associated with the prior art. And, while various illustrative embodiments of the invention have been described with particularity, it will be understood that various modifications will be apparent and can be readily made by those skilled in the art without departing from the scope and the spirit of the invention.

We claim:

1. A process for preparing cyclopentadienes of the general formula

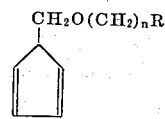

wherein R is a member selected from the group consisting essentially of hydrogen,

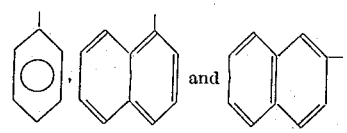

and *n* is 1 to 3 inclusive wherein said process comprises reacting at about −80°C to 25°C in an inert atmosphere and in the presence of an inert organic solvent, a compound of the formula

with a compound of the formula X—CH$_2$O(CH$_2$)$_n$R wherein X is a halogen, R and *n* are as defined to produce the desired cyclopentadienes.

2. A process for producing a compound according to claim 1 wherein the compound is 5-(methoxymethyl)-1,3-cyclopentadiene.

3. A process for producing a compound according to claim 1 wherein the compound is 5-(benzyloxymethyl)-1,3-cyclopentadiene.

* * * * *